United States Patent Office 3,437,425
Patented Apr. 8, 1969

3,437,425
METHOD OF REMOVING OXYGEN FROM CLOSED CONTAINERS AND CATALYST THEREFOR
Camilo Quesada, Park Ridge, Ill., assignor to Universal Oil Products Company, Des Plaines, Ill., a corporation of Delaware
No Drawing. Filed July 12, 1965, Ser. No. 471,453
Int. Cl. B01j 11/00; B65b 55/00, 31/00
U.S. Cl. 23—2                                       6 Claims

ABSTRACT OF THE DISCLOSURE

Oxygen is removed from closed containers by adding hydrogen thereto and contacting the gaseous mixture with a catalyst prepared by impregnating a base with a palladium chloride solution having a chlorine and palladium molar ratio of from 6 to 1 and 10 to 1 and thereafter drying and reducing the resulting impregnated base.

---

The present invention is directed to an improved oxidation catalyst and in particular to a method for preparing a finely divided catalyst having a high activity for combining oxygen with hydrogen in order to remove trace amounts of oxygen from closed container means.

Particularly with respect to packaging foods, as well as other packaged oxidizable materials, there may be a shortened "shelf-life" by the presence of oxygen within the package or container. In the packaging steps, an inert atmosphere may be utilized; however, due to the presence of oxygen carried into the container with the food or other product during the filling step, or by reason of diffusion, there may be a small amount of oxygen which is detrimentally present during and after the final sealing of the container. Where the oxygen can be entirely removed or converted within the package after sealing, there can be a substantially longer life to the material, particularly in the food products field. The catalytic conversion of oxygen in the presence of hydrogen, by combining the two, appears to be the most desirable rapid means for eliminating entrained oxygen within a container and therefore the present invention is directed to the use of an improved form of catalyst within the interior of a sealed package to effect oxygen scavenging therein at ambient conditions.

It is realized that there are many catalytic composites which may be utilized to speed up the desired reaction for the elimination of oxygen from a container; however, not all catalysts provide a rapid high activity at ambient conditions. For example, prior associated work seemed to show that the use of silica alone as the catalyst base or support material appeared to provide an inferior catalyst as compared to one with at least some alumina content. In addition to the many variations possible in the resulting activity level of a catalyst through the use of different activating components or varying amounts of a particular activating component, it was also found that there appeared to be an advantage to the use of palladium impregnated on finely divided particles for effecting the most efficient elimination of oxygen from a small closed container at ambient temperature conditions. From the economical aspect, it is of a definite advantage to have a simple direct means for obtaining the most active type of catalyst.

It is thus an object of the present invention to provide a catalyst suitable for oxidizing and eliminating small quantities of oxygen, where the catalyst composite is prepared in a specially controlled manner to have a high activity.

It may also be considered a principal object of the present invention to provide for the preparation of a fine grain catalyst composite utilizing an alumina or a silica-alumina base material having a platinum group metal activating component, preferably palladium, impregnated on the base material under controlled conditions resulting in good distribution of the palladium and a high activity.

Inasmuch as the entrained air or oxygen content carried into a sealed container is presumably distributed substantially uniformly throughout the entire interior, it is necessary that the catalytic conversion of the oxygen take place in a quiescent state primarily by diffusion movemtnt of the oxygen and hydrogen into contact with the catalyst. The catalyst may be positioned in a compact form or state within a central location within the interior of the container; however, from the practical aspects, the catalyst may be held or applied in a distributed manner along the interior surface of the container and thus provide an extended surface area for diffusion contact with the entrained oxygen and hydrogen within the package. The packaging of foods is frequently carried out by the use of small containers or cartons such that they are useful in providing individual servings or a small number of servings. As a result, the entire quantity of food will be relatively close to the interior wall surface of the container and the catalyst is advantageously attached to or applied to at least a portion of the interior wall surface thereof.

The terms "sealed" and "air-tight" as used herein in connection with packaging or container means, shall have reference to the fact that such container means is formed or fabricated of a material, or utilizes a liner, that is at least generally considered impervious to the passage of air under normal handling conditions for an extended period of time and, in addition, such container utilizes a tight cover, adhesive seal, wrapping or the like, that precludes air passage for an extended period of time. Such extended period of time should be beyond that which the goods would normally be used or consumed in the course of usual commercial conditions. The containers for incorporating the catalyst and holding the food or oxidizable goods may be actually completely sealed metal cans, glass jars, plastic containers, etc., or they may be made of plastic wrap materials, aluminum foil, or combinations thereof, as well as of paper or cardboard types of materials which in turn are coated or impregnated with wax or plastic to provide generally air impervious and waterproof surfaces.

In a broad aspect, the present invention provides a method for converting and eliminating residual oxygen from a small air-tight container at ambient temperature conditions after sealing an oxidizable material in such container, which comprises, packaging and sealing such material into the container within a controlled inert atmosphere and providing interiorly of said container a small quantity of finely divided catalyst composite comprising less than 1% palladium on an alumina containing refractory metal oxide support material, where such composite is prepared by impregnating the support with a palladium chloride solution having the chloride to palladium ratio in a range of above 6 to 1.

In a somewhat more specific embodiment, the invention is directed to a method for converting and eliminating trace quantities of oxygen from a sealed container by supplying a controlled inert atmosphere containing a quantity of hydrogen greater than that stoichiometrically required to combine with the entrained oxygen in a packaging zone whereby to provide added hydrogen with such entrained oxygen content and, in addition, adding a finely divided catalyst composite to the interior of said container for contact with said hydrogen and oxygen at ambient conditions therein, said catalyst composite having a finely divided refractory oxide base selected from the group consisting of alumina and silica-alumina, and said base is impregnated with a palladium chloride solution maintaining chlorine to palladium in a ratio of from about 6/1 to about 10/1 and providing 0.05% to 0.5% of palladium by weight in the resulting composite.

The chlorine to palladium ratio may be made still higher and desirable active catalysts obtained; however, there is some hazard in handling the highly acid mixes and the 10 to 1 range appears to be generally optimum for providing the highly active catalysts also, while there are many refractory oxide base materials which are useful as catalyst supports, it appears that silica and alumina or a combination thereof are the more widely used because of adaptability, relative economy, physical characteristics, etc.

The term "alumina" as used herein is intended to include porous aluminum oxide in the various states of hydration and it is not intended to be limited to just one method of preparation.

Relatively fine particles of alumina may be prepared as microspheres by the spray-drying technique where there is the spraying of an alumina hydrogel slurry into a heated drying and collecting chamber. In addition alumina precipitates of varying sizes can be prepared by adding ammonia to an aluminum salt solution, as, for example, aluminum chloride, aluminum nitrate, aluminum sulfate, etc. However, when the solution of such salt is contacted with ammonia in conventional precipitating procedures, then the pH may start at a low level and increase, or conversely, start at a high level and slowly decrease. As a result the precipitate usually has a low solids content and a final filter cake is made up of large agglomerate particles resulting from varying high localized pH levels during the precipitation procedure. Thus, both the spray drying and uncontrolled precipitating techniques require that the alumina must be ground or sieved to obtain the preferred small particles of less than 100 microns. A commercial alumina, known as Alcoa C-31, has a particle size primarily less than about 100 microns and appears to result in being a quite satisfactory support material.

It is not necessarily known why the ratio of chlorine to active metal provides such a great improvement in catalyst activity, but the high ratio seems to improve the distribution of the active component on to the support. Also, it does not appear necessary to have a given amount of residual chlorine remain with the finished catalyst composite, although preferably on the alumina-palladium composite, a residual chloride content of at least about 0.60% by weight thereof seems desirable for the ultra high activity level.

Since, in accordance with the present invention, the improved catalyst is to effect the combination of oxygen with hydrogen in a sealed container under ambient conditions, it is, of course, necessary that the catalyst be sufficiently active at normal room or storage temperatures to insure the combination of the gases from diffusion movement.

Also, since the catalytic material which is to be added to each sealed package will generally be lost upon the disposal of the container or package after it has been opened by user, it is economically advisable to use minimum quantities of catalyst within each sealed container in order to reduce overall costs. Thus, where palladium, or palladium and platinum or other expensive metallic activating components are utilized in the catalyst composite, then such materials will normally be utilized in small quantities which may comprise from about 0.01 percent to about 0.5 percent palladium by weight of the catalyst composite. Slightly larger quantities may be utilized with a noble metal compounded with another active metal, as, for example, copper, nickel, chromium, etc. A small container of from 5 to 15 cubic inches by content may require from about one-tenth to two grams of catalytic material, while with larger containers there may be substantially greater quantities of catalyst. The catalyst may, of course, be applied or positioned over one or more distributed areas within the container. The particular advantage of utilizing a finely divided support material is that it permits not only better catalytic contact but a more widely distributed surface area for equivalent weights of catalyst composite within any given sized container.

The impregnation of the metal oxide support material may be carried out in a conventional manner, as, for example with palladium, such component may be added to the carrier by commingling the latter with an aqueous solution of chloropalladic acid. Other water-soluble compounds of palladium, or of the other noble metal components may be utilized within the impregnating solution and may include, for example, ammonium chloroplatinate, platinous chloride, platinic chloride, dinitro-diammino-platinum, etc. Where the catalytic is to contain other nonnoble metallic components, the catalyst may be prepared by commingling water-soluble compounds of these components, particularly the nitrates, sulfates, chlorates, chlorides, or carbonates and soaking the particles of the inorganic refractory oxide therein followed by heating to form the corresponding oxides of the metallic components. Although the precise means by which the metallic component is combined with the refractory material is not known, it is believed that it exists in some physical association or chemical complex therewith. Thus, the palladium may be present as such, or as a chemical compound or in physical association with the refractory inorganic oxide, or with the other catalytically active metallic components, or in some combination with both.

The catalytic impregnation may also be carried out in the presence of an additive component such as, for example, thiomalic acid, which appears to be effective in having the palladium impregnate the surface portion of the catalyst support whereby all of the activating component is available for carrying out the catalytic combination of the oxygen with the hydrogen. Varying amounts of thiomalic acid may be utilized; however, it has been found that about a 3 to 1 molar ratio of tiomalic acid to chloropalladic acid provides a desired form of surface impregnation.

A preferred catalyst preparation step also includes effecting the reduction of the impregnated and dried catalyst composite in the presence of hydrogen or other reducing gas, with such reducing step being carried out for one or more hours at an elevated temperature of at least about 650° F.

By way of setting forth a detailed procedure, an optimum method of preparation in order to obtain a resulting highly active catalyst will include the following operations:

(1) Dissolve the desired quantity of palladium chloride in a mixture of water and hydrochloric acid at about 115° F. that will provide an approximate 1/1 molar ratio of chlorine to palladium. Once the palladium has dissolved, heat the solution to about 160° F. along with constant stirring and remove from the heat on reaching that temperature. The water is added in an amount to yield a solution concentration of not more than about 0.003 grams of palladium per cubic centimeter. It is to be noted that higher palladium concentrations may be used in the solution, but the activity of the finished catalyst may not be as high as that obtained from the 0.003 gram of palladium per cubic centimeter solution.

(2) Impregnate the alumina or other oxide base with the solution and permit excess water to evaporate with heating at about 150° F. to 220° F. Generally, before impregnation, the metal oxide base will be calcined at a temperature in the range of from about 900° F. to about 1400° F. and preferably at about 1200° F. Continue drying under an air flow until the water content is down to about 8%, at which time air drying may be at about 300° F.

(3) Carry out continued drying and calcination under air on the dried catalyst for 1½ to 2 hours at about 850° F., for example, an appropriate air flow has been found to be a 120 gas hourly space velocity.

(4) Reduce the temperature to about 400° F. and purge with nitrogen.

(5) Introduce hydrogen to purged catalyst and maintain the hydrogen flow for about 1½ hours to 2 hours at 650° F. for example hydrogen flow may be at a rate to provide a gas hourly space velocity of from about 80 to about 120.

(6) Allow the reduced catalyst to cool to room temperature and then purge it again with nitrogen.

As indicated hereinbefore, in order to insure en effective conversion and elimination of the residual oxygen content within a sealed container at ambient conditions, it is necessary to insure the presence of hydrogen, for example, by adding a given quantity of hydrogen to the controlled atmosphere which is maintained for the packaging operations. The amount of added hydrogen shall be something more than the stoichiometric amount necessary to combine with the oxygen in the container in question and may be readily correlated with the average amount of oxygen which is found to be present in connection with a given packaging step for any given oxidizable material. In other words, preferably, the hydrogen shall be present in at least twice the molar quantity of the residual oxygen content for the particular packaging step whereby such oxygen may be rapidly catalytically combined with the hydrogen to form water vapor or droplets within the container upon diffusive movement of the gases into contact with the catalyst positioned interiorly of said container.

The following typical examples will serve to show how improved controlled impregnation procedures will in turn provide a resulting improved form of activated catalyst suitable for use within the interior of a sealed container and effect the elimination of entrained oxygen at ambient conditions.

In order to check various catalyst samples for activity, a test procedure was worked out which utilized apparatus to determine oxygen concentration versus residence time in a test reactor receiving a standard gas blend of oxygen-hydrogen and nitrogen (2.0% $O_2$; 5.0% $H_2$ and balance $N_2$). Briefly, the test apparatus involves the use of a gas blend tank, a small reactor, and a Beckman Model 777 laboratory oxygen analyzer. The reactor is a small tubular glass unit about 2.0 centimeters long, with a 0.15 centimeter inside diameter, and has means to place a small piece of filter paper at each end thereof.

In the operation of the test unit, a sample of catalyst is placed in the reactor, for a height of about 0.80 centimeter and gas flow from the gas blend tank is permitted to pass through the reactor unit to the analyzer at a rate of from 10 to 3 cc./min. After the oxygen concentration reaches equilibrium for at least 30 minutes, then the oxygen reading is taken. The activity of a catalyst is expressed with respect to a "standard" catalyst or "reference" catalyst. Thus, activity $$A = \frac{tr}{ts} \times 100$$

where $tr$=residence time for the reference catalyst, and $ts$=residence time for the sample in question that is required, in each instance, to bring the gas blend to a certain equilibrium concentration. With some very active catalyst it is necessary to dilute them, for the purpose of testing, with an inert material (preferably the catalyst support) so that the $O_2$ equilibrium concentration will lie within the detector's sensitivity range.

Example I

In one test operation, a catalyst was prepared by impregnating fine silica-alumina micro-spheres (passing a No. 140 mesh) with palladium chloride to provide 0.50% Pd by weight of the finished catalyst. The silica-alumina particles were obtained from a spray-drying operation preparing fluid catalytic cracking catalyst, where the slurry mixture resulted in a 86% silica-14% alumina finished composite. The impregnation solution used hydrochloric acid and palladium chloride in amounts to provide a molar ratio of about 2.5 to 1 of chlorine to palladium and water in an amount to provide the resulting 0.50% Pd on the finished catalyst. The impregnated base was first dried and then calcined at 1094° F. for about 1½ hours. The calcination was followed by a hydrogen reduction for about 1½ hours at 932° F. A nitrogen purge stream was used on the catalyst preceding and following the hydrogen reduction step.

A portion of this catalyst was placed in the glass reactor described hereinbefore for use in testing catalyst activity and was subjected to contact with the standard gas blend used in the testing procedure. The resulting activity calculated after equilibrium was 100, or equal to a standard reference catalyst.

Example II

The catalyst used in this example had a silica-alumina base of fluid catalytic cracking catalyst of the same type as described in connection with Example I; however, in this instance the base was impregnated with a solution providing a resulting 0.30 percent palladium on the finished catalyst. The impregnation solution was hydrochloric acid, palladium chloride and water, with a molar ratio of chlorine to palladium being 2.5 to 1. The impregnated and dried catalyst was calcined at 1100° F. for 2 hours and then following a nitrogen purge was reduced in the presence of hydrogen for about 2 hours at 482° F.

A portion of this catalyst, when tested in the activity testing equipment in accordance with the testing procedure hereinbefore described, provided an activity equal to 5, as compared with a reference catalyst having an activity of 100.

Example III

In this test, a catalyst was prepared in the same manner as that set forth in Example II, utilizing fluid catalytic cracking catalyst fines with 0.30 percent palladium by weight of the finish composite except, however, for the reduction step there was an increased temperature level used at an approximate 932° F.

Upon testing a sample of the present catalyst in the activity testing apparatus there was found to be a resulting activity of 206.

Example IV

The catalyst for this example was prepared by impregnating a finely divided commercial "catalyst grade" alumina known as Alcoa's F–20. The base was subjected to impregnation in the same manner as set forth in the previous examples utilizing a hydrochloric acid and palladium chloride in amounts to provide at least at 6/1 ratio of chlorine to palladium. The impregnated base was dried and calcined at 1094° F. for about two hours and the resulting nitrogen purged and calcined composite subjected to hydrogen and reduction for about two hours at 932° F.

The activity testing procedure for this catalyst showed a resulting initial activity of 7,613 as compared with the standard reference catalyst.

Example V

The catalyst tested under this example also used a commercial alumina base material, known as Alcoa C–31. This base material is supplied as a hydrated alumina in a fine white crystalline form providing a lesser iron content than the F–20 base referred to in Example IV. The C–31 alumina has 0.010 $Fe_2O_3$ as compared with 0.12 $Fe_2O_3$ in the F–20 alumina. The C–31 alumina base was impregnated, calcined and reduced in the same manner set forth in the previous example providing an approximate 0.50 percent palladium in the finished composite.

An analysis of the finished catalyst also showed 0.57 percent chlorine by weight of the composite.

The activity testing procedure for the catalyst showed an activity of 8,057.

Example VI

The catalyst for this test operation also utilized a C-31 alumina base material and was impregnated with a solution providing a resulting finished composite with 0.50 percent palladium by weight thereof. However, in this instance, the hydrochloric acid-palladium chloride impregnation solution was prepared to provide a resulting 10/1 molar ratio of chlorine to palladium. The calcination and reduction steps were carried out in the manner described in connection with the previous example at temperature levels of approximately 1094° F. and 932° F. respectively. An analysis of the residual chlorine in the composite showed 1.02% chlorine by weight of the composite.

Upon subjecting a sample of the present catalyst to the activity testing procedure, there was found a resulting initial activity of 10,772.

Example VII

The catalyst tested for the present example was again a C-31 alumina base with 0.5 percent palladium by weight of a composite, with impregnation and preparation steps being the same as those set forth in connection with the previous Example VI. The catalyst in this example was, however, subjected to being sieved through a No. 100 mesh screen such that it was somewhat finer than that used in the prior example.

A sample of this sieved catalyst, upon being subjected to activity testing procedure, showed a resulting activity of 16,103.

Example VIII

The catalyst for this test operation was initially prepared in the same manner as that set forth in Example VI, utilizing a C-31 Alcoa alumina base material subjected to impregnation in the manner providing a 10/1 molar ratio of chlorine to palladium in the solution. However, the calcined and reduced catalyst composite was, prior to testing, subjected to reoxidation at 850° F. and to re-reduction at 660° F. for approximately 2 hours for each step.

Upon subjecting a sample of this catalyst to the activity testing procedure, there was found a resulting activity of 17,779.

Example IX

The catalyst for this test operation again utilized a C-31 alumina base material that was impregnated under control conditions providing a 10/1 molar ratio of chlorine to palladium in the impregnating solution. The impregnated composite was also subjected to calcination and reduction steps in accordance with conditions described in the previous examples.

An analysis of the finished composite showed, in this instance, a residual chlorine content of 0.92% chlorine by weight of the finished composite. The palladium content was analyzed to be 0.47% by weight of the finished composite.

The activity testing of the present catalyst showed a resulting very high activity level which was greater than 20,000, but was actually indeterminable because of limitations in the apparatus being used.

Example X

The catalyst for this operation was prepared in the same manner as that set forth in connection with Example IX providing a resulting 0.46% palladium by weight of the finished composite and 0.96% chlorine by weight thereof.

Upon subjecting a sample of the present catalyst to the activity testing procedure, there was again found an activity of greater than 20,000.

Example XI

The catalyst for this test was prepared from a silica-alumina base in the same manner as that set forth in Example I, except in this instance there was a 10 to 1 molar ratio of chlorine to palladium in effecting the impregnation of the palladium to the base.

When testing a portion of this catalyst in the activity test equipment, there was found an activity of 5,121.

Example XII

In still another test, a catalyst was prepared in accordance with the procedure of the previous example, i.e., utilizing a 10 to 1 molar ratio of chlorine to palladium in effecting the impregnation of the silica-alumina base to have about 0.5% palladium in the finished catalyst composite.

Upon testing the finished catalyst in accordance with the standard procedure there was a resulting activity of 5,071.

Reference to the accompanying Table I will provide a summary of the various catalysts and the determined activities which were described in the foregoing examples.

A review of the test results as typified by the examples, show that the use of a high molar ratio of chlorine to palladium in the impregnating solution is effective for providing very high activities for the resulting catalyst composites.

In still another instance, it may be noted that the reduction temperature level appears to have a bearing on the activity of the finished composite. For example, it will be noted in comparing Examples II and III that the higher reduction temperature gave a substantially higher activity to the resulting catalyst. Thus, it appears that the reduction step should be carried out at a temperature above the 480° F. level and generally about 650° F. The value of reoxidation and re-reduction steps do not appear to be definitely established, although the results in Example VII show that there was a slightly higher activity to the catalyst composite which was subjected to both the catalyst reoxidation and re-reduction.

TABLE I

| Example No. | Catalyst type | Percent residual chloride | Activity |
|---|---|---|---|
| I | $SiO_2$ and $Al_2O_3$ and 0.50 Pd, reduced at 930° F.[1] | | 100 |
| II | $SiO_2$ and $Al_2O_3$ and 0.30 Pd, reduced at 482° F.[1] | | <10 |
| III | $SiO_2$ and $Al_2O_3$ and 0.30 Pd, reduced at 932° F.[1] | | 206 |
| IV | F-20 Alcoa alumina and 0.05 Pd | | 7,613 |
| V | Alcoa C-31 alumina and 0.05 Pd | 0.57 | 8,057 |
| VI | C-31 and 0.5 Pd, 10/1 molar ratio Cl/Pd. | 1.02 | 10,772 |
| VII | C-31 and 0.5 Pd, 10/1 molar ratio Cl/Pd, seived through U.S. No. 100 mesh. | 1.02 | 16,103 |
| VIII | C-31 and 0.5 Pd, 10/1 molar ratio Cl/Pd, reoxidized and rereduction. | | 17,779 |
| IX | C-31 and 0.47 Pd, 10/1 molar ratio Cl/Pd. | .92 | >20,000 |
| X | C-31 and 0.46 Pd, 10/1 molar ratio Cl/Pd. | .96 | >20,000 |
| XI | $SiO_2$ and $Al_2O_3$ and 0.50 Pd, 10/1 molar ratio Cl/Pd. | | 5,121 |
| XII | $SiO_2$ and $Al_2O_3$ and 0.50 Pd, 10/1 molar ratio Cl/Pd. | | 5,071 |

[1] Impregnation with 2.5/1 molar ratio of Cl to Pd.

I claim as my invention:

1. A method for removing oxygen by the formation of water in a hydrogen atmosphere in a closed container by introducing hydrogen into such atmosphere and contacting the gaseous mixture at ambient temperature with a subdivided catalyst held within the container, said catalyst having been prepared by impregnating a finely divided inorganic oxide base material with a palladium chloride containing solution having a chlorine to palladium molar ratio above 6 to 1, and thereafter drying and reducing the resulting impregnated base.

2. An oxygen scavenging catalyst providing a high activity for combining hydrogen and oxygen which is prepared in the manner comprising, impregnating a finely divided alumina containing catalyst base with a palladium chloride solution having a chlorine to palladium molar ratio above 6 to 1, and thereafter drying and reducing the resulting impregnated alumina.

3. An oxygen scavenging catalyst providing a high activity for combining oxygen and hydrogen which is prepared in the manner comprising, impregnating a finely divided alumina containing catalyst base with an aqueous hydrochloric acid and palladium chloride solution having a chlorine to palladium ratio within the range of 6 to 1 to about 10 to 1, effecting the drying of the impregnated base and a high temperature calcination above about 850° F. for a period of at least one-half hour, and subsequently reducing the calcined composite in the presence of hydrogen for a period of time of at least one-half hour at a temperature level of above about 650° F.

4. The oxygen scavenging catalyst of claim 3 further characterized in that said catalyst base consists essentially of alumina.

5. The oxygen scavenging catalyst of claim 3 further characterized in that said catalyst base consists essentially of silica-alumina.

6. An oxygen scavenging catalyst providing a high activity that is prepared in the manner which comprises, impregnating a finely divided alumina containing base with an impregnating solution containing palladium chloride in an amount providing from 0.1% to about 0.5% palladium in a finished catalyst composite, said solution further containing hydrochloric acid and in an amount providing a chlorine to palladium molar ratio within the range of about 6 to 1 to about 10 to 1, the resulting impregnated and dried base being subsequently subjected to calcination for at least a one-half hour period at a temperature level above about 850° F. subjecting the thusly calcined composite to cooling and to a nitrogen purge, and then subjecting the purged composite to reduction in the presence of hydrogen for at least a one-half hour period at a temperature level of at least about 650° F.

References Cited

UNITED STATES PATENTS

| | | | |
|---|---|---|---|
| 2,760,999 | 8/1956 | Oblad et al. | 252—460 X |
| 3,060,133 | 10/1962 | Jockers et al. | 252—466 X |
| 3,123,491 | 3/1964 | Beaumont | 99—189 X |
| 3,255,020 | 6/1966 | Ferrell | 99—189 |

OSCAR R. VERTIZ, *Primary Examiner.*

E. C. THOMAS, *Assistant Examiner.*

U.S. Cl. X.R.

99—189; 252—442, 460, 466